United States Patent [19]

Geiger

[11] Patent Number: 5,299,054
[45] Date of Patent: Mar. 29, 1994

[54] OPTICAL SWITCH

[75] Inventor: Allen R. Geiger, Las Cruces, N. Mex.

[73] Assignee: PetroLaser, Inc., Las Cruces, N. Mex.

[21] Appl. No.: 868,299

[22] Filed: Apr. 14, 1992

Related U.S. Application Data

[63] Continuation-in-part of Ser. No. 771,818, Oct. 7, 1991, abandoned, which is a continuation of Ser. No. 542,537, Jun. 25, 1990, abandoned.

[51] Int. Cl.[5] ............................ G02F 1/03; G02F 1/33; G02B 6/26
[52] U.S. Cl. ................................ 359/251; 359/245; 359/254; 359/298; 359/315; 359/320; 385/17; 385/20; 385/33
[58] Field of Search ............... 359/245, 246, 247, 251, 359/256, 315, 320, 197, 202, 298, 58, 252, 257, 254; 385/17, 18, 24, 22, 20, 21, 119, 33, 35

[56] References Cited

U.S. PATENT DOCUMENTS

| | | | |
|---|---|---|---|
| 3,363,103 | 1/1968 | Fowler et al. | 359/254 |
| 3,449,038 | 6/1969 | Scarrot | 359/254 |
| 3,614,200 | 10/1971 | Taylor | 359/254 |
| 3,900,247 | 8/1975 | Zaky | 359/256 |
| 4,222,638 | 9/1980 | Robert | 385/17 |
| 4,229,071 | 10/1980 | d'Auria et al. | 359/254 |
| 4,405,869 | 9/1983 | May | 307/405 |
| 4,569,573 | 2/1986 | Agostinelli | 350/320 |
| 4,614,408 | 9/1986 | Mir et al. | 359/254 |
| 4,636,799 | 2/1987 | Kubick | 343/754 |
| 4,641,923 | 2/1987 | Bohmer et al. | 350/335 |
| 4,958,914 | 9/1990 | Owechko et al. | 350/342 |
| 5,071,232 | 12/1991 | Kato et al. | 359/315 |

*Primary Examiner*—Bruce Y. Arnold
*Assistant Examiner*—Evelyn A. Lester
*Attorney, Agent, or Firm*—Kramer, Brufsky & Cifelli

[57] ABSTRACT

An optical medium, which may be nonlinear, is provided with a matrix of conductors ("select lines") parallel to a face (planar surface) of the optical medium. The select lines are preferably superconductive, and are arranged in a two offset planar, preferably orthogonal sets. Adjacent pairs of select lines in both sets of select lines define discrete volumes, or "cells" within the optical medium. Light directed through the cells is refracted at angles determined by the quiescent optical properties of the optical medium, and may be "steered" to different angles by current passing through the select lines.

24 Claims, 10 Drawing Sheets

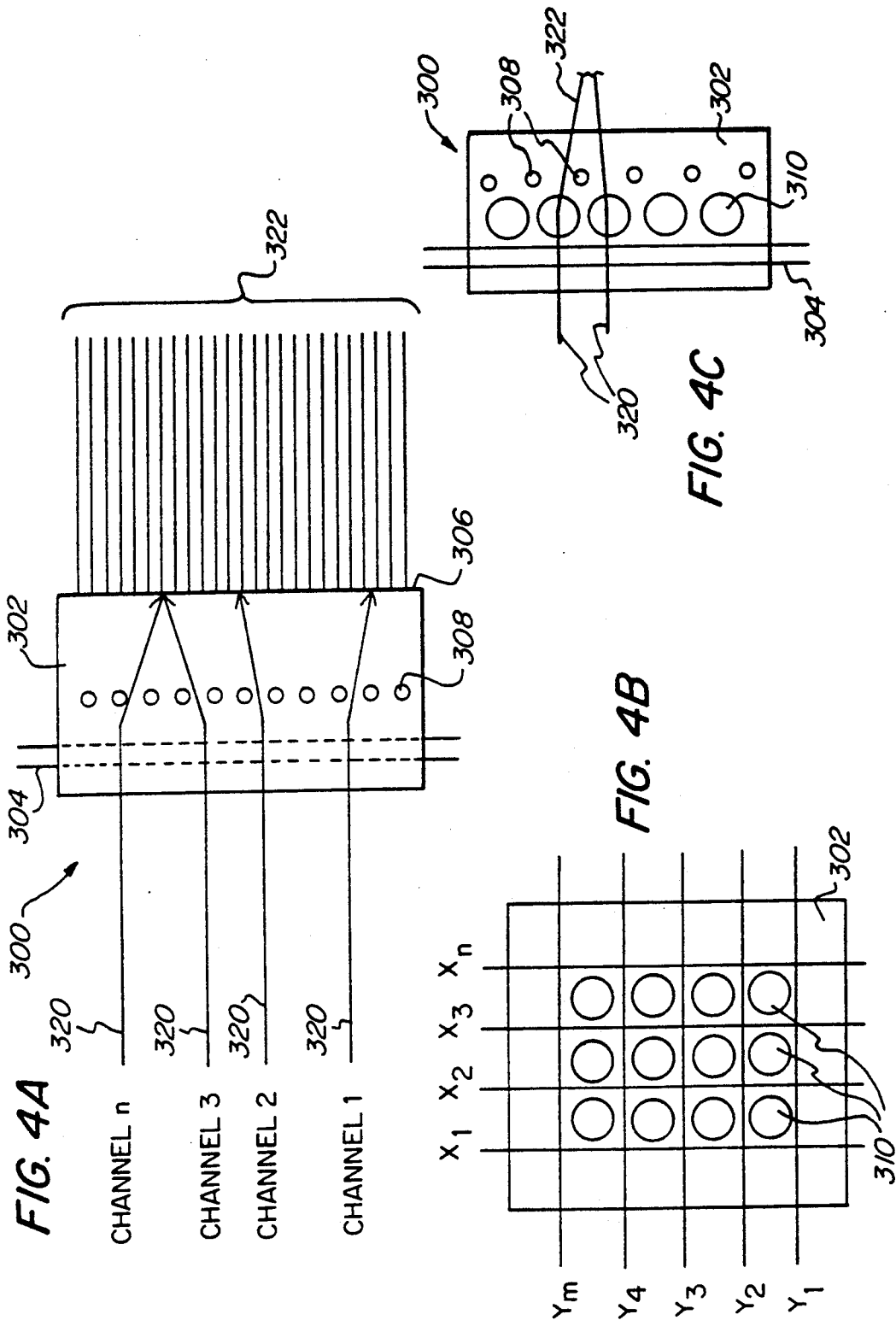

OPTICAL SWITCH

CROSS REFERENCE TO RELATED APPLICATIONS

This application is a continuation-in-part of application Ser. No. 07/771,818 filed Oct. 7, 1991, abandoned which is a continuation of application Ser. No. 07/542,537 filed Jun. 25, 1990, abandoned.

TECHNICAL FIELD OF THE INVENTION

The invention relates to optical switches, such as for selectively directing light signals from a plurality of input paths to a plurality of output paths.

BACKGROUND OF THE INVENTION

Optical switches, which are switching elements based on photons rather than electrons, are finding increased applications. In one example, optical switches are employed in conjunction with optical fibers in communication networks. In other cases, optical switching elements are being evaluated for use in ultra high speed computers since photons travel significantly faster than electrons, can travel in free space and can cross paths without interference.

Typical fiber-optic switches are relatively bulky, operate at low switching speeds, have limited lifetime switching cycles, and can access only a very limited number of channels. Examples of such fiber-optic switches are discussed with respect to FIGS. 1 and 2 below.

A class of optical media, particularly crystals, exhibits nonlinear behavior. The class includes materials such as Beta Barium Borate (BBO), Lanthanum Borate (LaB), Lithium Triborate (LBO), Nd:YAlBO$_3$, Terbium and Erbium Borate, and Potassium Niobate.

Frequency doubling is an example of such nonlinear behavior. Frequency doubling is a specific example of what is known as the sum-frequency generation process, and occurs when an incident radiation of frequency v, on propagating through some crystalline materials, emerges as radiation consisting of a mixture of two frequencies, the original frequency v and a new frequency 2v.

The inverse of the aforementioned sum-frequency process is the optical parametric process, wherein incident radiation having a frequency v, on propagating through a nonlinear medium is converted into two lower frequency (higher wavelength) waves, which are of essentially variable frequency.

The parametric behavior of materials has been shown to be useful in creating optical logic gates. U.S. Pat. No. 4,405,869, entitled OPTICAL PARAMETRONS, shows an optical parametric logic gate. The parametric logic gate includes an optical resonant cavity having nonlinear optical characteristics, such that the cavity will generate a subharmonic output signal having a frequency f when supplied with a pump frequency 2f. The subharmonic output signal may have one of two possible phases which differ by $\pi$ radians and correspond to binary 1 and 0 respectively. A bias signal having a frequency f is supplied to the resonant cavity. Optical input signals are summed with the bias signal to produce a resultant seed input signal having one of two phases. The phase of the seed input signal is imparted to the phase of the output subharmonic. The type of logical operation which the parametron performs can be controlled by adjusting the power of the bias signal. Input and output interfaces for the optical parametron are also disclosed.

Another behavioral characteristic of nonlinear optical media is the ability of the material to change its refractive index in the presence of a strong electromagnetic field. In this manner, the angle of light passing therethrough can be modified according to the strength and direction of the field, albeit within a limited range of angles. This effect is a piezoelectric type effect, and is analogous to the magnetorestrictive effect observed in other materials and employed for micropositioning.

SUMMARY OF THE INVENTION

It is an object of the present invention to provide an optical switch that is small, operates at high switching speeds, has a lifetime of virtually unlimited switching cycles, and that can access many channels.

It is a further object of the invention that the optical switch have no moving parts.

According to the invention, an optical medium, which may be nonlinear, is provided with a matrix of conductors ("select lines") parallel to a face (planar surface) of the optical medium. The select lines may be superconductive. However, the select lines can also be constructed of small metal wires or conducting polymers, and are arranged in two planar, preferably orthogonal sets. Adjacent pairs of select lines in both sets of select lines define discrete volumes, or "cells" within the optical medium. Light directed through the cells is refracted at angles determined by the quiescent optical properties of the optical medium, and may be "steered" to different angles by current passing through the select lines.

A plurality of light input channels is defined normal to one face of the optical medium, each input channel corresponding to a particular cell. However, the number of input channels may be fewer than the number of cells. A plurality of output paths are defined normal to an opposite face of the optical medium, each output path preferably corresponding to a particular cell. The number of output paths typically corresponds to the number of cells.

An exemplary embodiment of the optical switch is shown and described as having two hundred select lines in one set ($X_n$) and two hundred select lines in another, generally orthogonal set ($Y_m$) With this configuration, approximately 40,000 cells are formed in the optical medium. Each cell is defined by the four select lines $X_n$, $X_{n+1}$, $Y_m$, $Y_{m+1}$.

Light signals are introduced in input channels to various cells by optical fibers mated with a face of the optical medium. As noted above, the number of input channels may be fewer than the number of cells. In this case, the input channels are preferably evenly spaced apart with respect to the cell arrangement.

Upon passing through a cell, the light signals are refracted in the first instance by the refractive properties of the optical medium. High current signals are passed through the select lines defining a cell, and cause a predictable and controlled deflection of the light passing through the cell. In order to achieve this effect, the current densities in the select lines must be high, which would be possible with superconducting select lines, for example. Given that the current in each of the four select lines may have a positive or negative polarity, sixteen different refractive angles may be selected. Further, the degree of refraction in each of these directions is proportional to the current density in the select lines. Hence, a large number of refractive angles may be selected by controlling the current through the select lines. Light exiting an opposite (output) face of the optical medium is directed to optical fibers which may be mated to the output face of the medium.

The invention is applicable to telecommunications systems, optical disc readers, optical neural nets, fly-by-light systems, etc.

Other objects, features and advantages of the invention will become apparent in light of the following description thereof.

BRIEF DESCRIPTION OF THE DRAWINGS

FIG. 4A is a schematic representation of the optical switch of FIG. 3.

FIG. 4B is a diagram indicating cell layout in the optical switch of FIG. 4A.

FIG. 4C is a diagram indicating refractive phenomena in the optical switch of FIG. 4A.

DETAILED DESCRIPTION OF THE INVENTION

Figure 2:
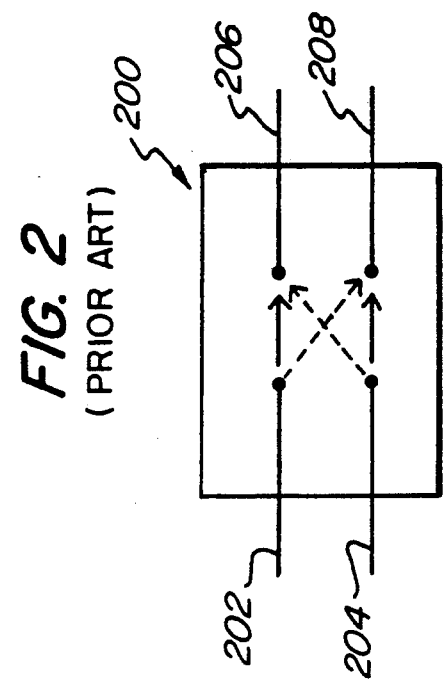
FIG. 2 is a schematic diagram of another optical switch of the prior art.
Figure 1:
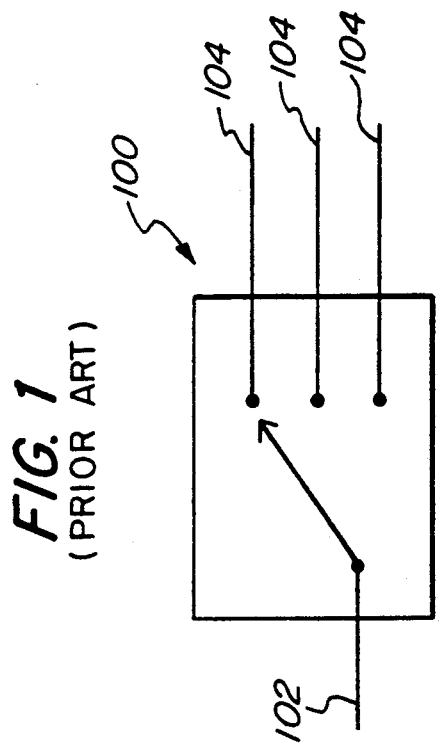
FIG. 1 is a schematic diagram of an optical switch of the prior art.

FIGS. 1 and 2 show optical switches of the prior art. FIG. 1 represents a device 100 marketed by British Telecom and DuPont as the model MBS1300 Fiber-optic Switch, and FIG. 2 represents a similar device 200 marketed as the model MBS2200 Fiber-optic Switch. Each of these devices 100, 200 measures about two inches on a side and three quarters of an inch thick, operate at wavelengths of 800 nm-1600 nm, have a switching speed of about 15 milliseconds, a lifetime of $10^7$ cycles, and provide access up to only four channels.

The switch 100 of FIG. 1 is a simple single-pole, three-throw switch, having one input 102 and three outputs 104. The switch 200 of FIG. 2 has two inputs 202, 204 and two outputs 206, 208. Evidently, the switching capabilities of these two switches 100, 200 is rather limited.

Figure 3:
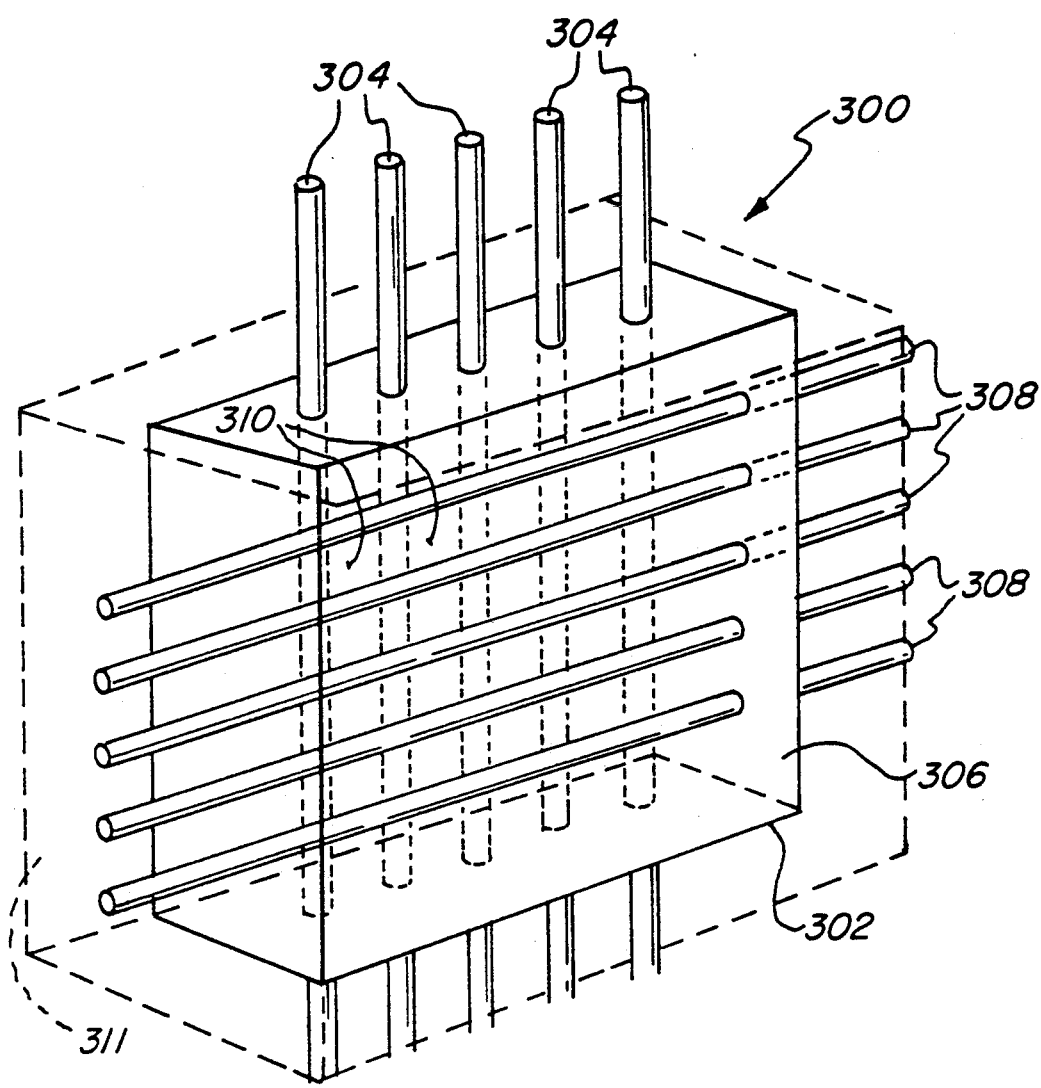
FIG. 3 is a stylized perspective representation of the optical switch of the present invention.

FIG. 3 shows, generally, the optical switch 300 of the present invention. A rectangular solid substrate 302 is formed of a nonlinear or photorefractive optical medium, discussed below. Typical dimensions for the substrate 302 are approximately one half inch on a side and one quarter of an inch thick.

A first plurality of parallel, spaced-apart, electrically conductive lines 304 is embedded within the substrate 302, in a first plane parallel to a face 306 of the substrate. Five lines 304 are shown, but it will be understood that a larger number of lines, such as two hundred lines, can be embedded in this manner. In the example of a side measuring one half inch, for two hundred lines the spacing of the lines would be on the order of two and one half thousandths of an inch (center-to-center). Line widths on the order of one thousandth of an inch are readily accommodated in such a configuration.

A second plurality of parallel, spaced-apart, electrically conductive lines 308 is embedded within the substrate 302 in a second plane, such that the conductors 308 are generally orthogonal to the conductors 304. Again, only five lines 308 are illustrated, but a larger number of lines, such as two hundred lines, can be accommodated within the substrate. The second plane (of the conductors 308) is preferably parallel to the first plane (of the conductors 304, and hence to the face 306).

The conductors 304, 308 can be superconductive, but may also be made of metal or conductive polymers. As will be seen hereinafter, the lines 304, 308 are required to establish extremely high flux densities within the substrate 302. To this end, appropriate superconductive materials and cooling systems are chosen which are readily available to those skilled in the art. For example, the optical switch 300 may be enclosed within a refrigerated dewar 311 with windows to permit optical transmission, indicated schematically in FIG. 3, in a manner known to those skilled in the art. For higher temperature superconducting materials, it may be possible to mount the optical switch 300 on a Peltier cooler. As will be recognized by those skilled in the art, there are various means available for appropriately cooling the optical switch 300.

In the solid area bounded by adjacent pairs of first conductors 304 and adjacent pairs of second conductors 308 are a number of discrete volumes 310 within the substrate, termed "cells". In a configuration having two hundred each of the first and second conductors ($200 \times 200$), there would be nearly 40,000 ($199^2$) cells. As will be explained in greater detail below, the refractive angle of light passing through a cell 310 of the substrate from one face to the opposite face can be altered by electrical current passing through the four conductors (two pairs from each set of conductors) bordering the cell. This phenomenon is advantageously employed to direct light from a plurality of input channels, each corresponding to a particular cell, to a plurality of outputs, each corresponding to a particular cell.

One method of constructing the switch 300 includes the local diffusion of the superconducting select lines into the optical substrate. Many suitable construction techniques can be found in the fields of thin film optics and integrated optics for communication purposes. Another method involves creating a grid of superconductive lines (conductors), possibly supported in a lead frame, and growing the crystalline optical medium around the grid. Yet another method is to use isostatic pressing to fuse the nonlinear material and conductive grid into a single element.

FIGS. 4A–4C illustrate in further detail the construction and operation of the switch 300. FIGS. 4A and 4C are side views of the switch 300 and FIG. 4B is a plan view of the switch 300. The cells 310 are represented as large circles 322 in FIGS. 4B and 4C.

As shown in FIG. 4A, a plurality of input paths (or channels) 320 is provided, such as by optical fibers (not shown). The input paths are "normally" (in the mathematical sense) incident to a face of the substrate. Each input path is aligned with a cell 310 of the substrate, but there may be fewer input paths 320 than cells 310, as illustrated. A plurality of optical fibers 322 is provided normal to the opposite face (e.g., 306). The optical fibers 322 essentially cover the entire surface area of the face. As will be discussed below, the optical fibers 322 are not necessarily aligned on a one-to-one basis with the cells, but preferably are contained within a bundle having a regular pattern.

As illustrated in FIGS. 4A and 4C, light entering a particular cell 310 is refracted within the cell, and the angle of refraction can be altered by current on the pairs of adjacent lines 304 and 308 ($X_n$, $X_{n+1}$, $Y_m$, $Y_{m+1}$; see FIG. 4B) bounding that particular cell. In this manner, light entering the switch 300 along a particular path 320 can be selectively directed, or "steered", to a number, albeit limited, of output paths 322.

Hence, an efficient means of directing light from an input path to any of a number of output paths is provided.

As indicated in FIG. 4A, the light from two input channels (Channel 3 and Channel n in FIG. 4A) can be directed to the same output path. It is also possible to direct the light from more than two input channels to a single output path. Hence, the switch 300 is also useful for multiplexing and mixing.

The switch operates best when coherent light is introduced to the input channels. For the exemplary dimensions of the switch given above, which are in thousandths of an inch, it is well within the skill of the art to mate a semiconductor chip containing a similar density of working lasers to the input face of the substrate 302. Densities on the order of one million working lasers per square inch are known.

Figure 5C:
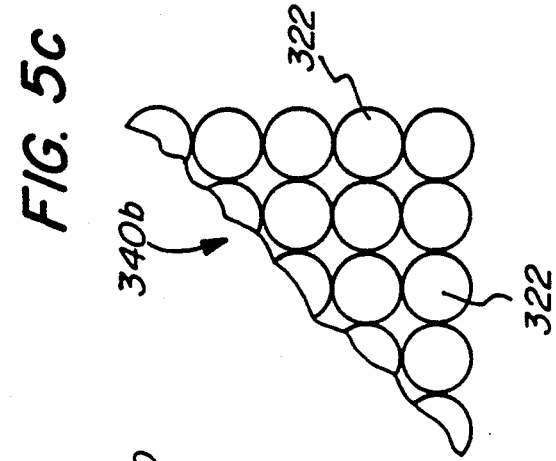
FIGS. 5B and 5C are cross-sectional views of two embodiments of the optical fiber bundle of FIG. 5A.
Figure 5A:
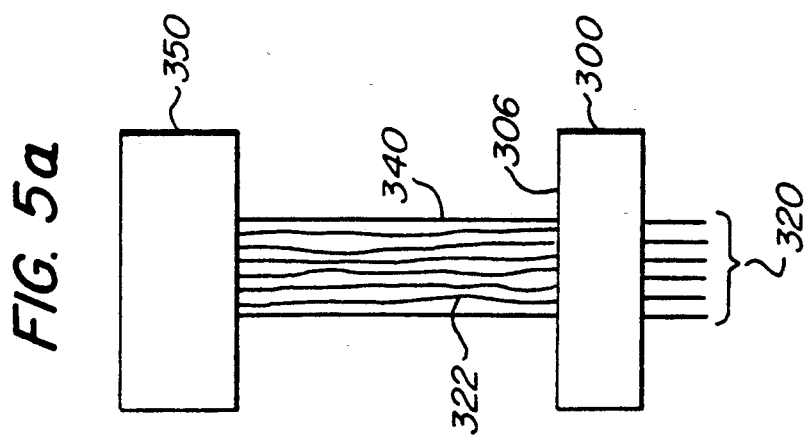
FIG. 5A is a diagram illustrating the "self-testing" feature of the optical switch of FIG. 4A.
Figure 5B:
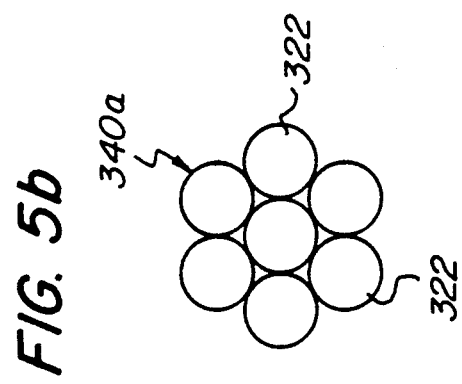

FIG. 5A illustrates the feature that the switch 300 can be "self-testing". A bundle 340 of optical fibers 322 (FIGS. 5B and 5C) is juxtaposed with the output face (e.g., 306) of the switch 300. The number of fibers corresponds to the number of cells 310 (FIG. 4B) in the switch. In this example, there would be 40,000 fibers. It would clearly be difficult to determine the individual locations of the optical fibers 322 on the face of the switch. However, such a determination is not necessary, so long as the bundle 340 is arranged in a regular pattern, and preferably in a sorted arrangement (the position of each fiber in the bundle is known, but the orientation of the bundle with respect to the switch is not known). A first suitable pattern is a "circular" pattern, shown in FIG. 5B as 340a, which is a cross section of an exemplary bundle 340. Inasmuch as optical fibers typically have a circular cross-section, this is a "natural" configuration for the bundle. Another possible pattern is a "square" pattern, shown partially in FIG. 5C as 340b. With optical fibers of circular cross section, the square pattern would have to be forced.

In either case (circular or square bundle), the spacing between fibers (center-to-center) corresponds to the spacing of the cells, in this example two and one half thousandths of an inch, which is readily attainable with standard optical fibers.

When the position of the bundle 340 is fixed with respect to the switch 300, its orientation can be determined in the following manner. A light signal is directed along a particular input path 320, and it is noted which fiber (or fibers) 322 receives the light. This is readily accomplished in a test jig that includes an array 350 of photoreceptors, each photoreceptor corresponding to a particular fiber 322. In the case of a regular (e.g., circular or square pattern) sorted bundle 340, the orientation of the bundle with respect to the switch can readily be determined.

In the case of a bundle 340 that is regular (e.g., circular or square pattern), but is not sorted (the position of each fiber within the bundle is not known), the select lines 304 and 308 may be biased in a predetermined pattern to determine the exact location of each individual fiber 322 with respect to the substrate 302.

Hence, so long as the bundle 340 is accurately mated (fixed) to the switch, and is preferably sorted, a one-to-one correspondence between the switching cells 310 and the output fibers 322 is readily determined.

The switch 300 is capable of operating at wavelengths between 800 nm–1600 nm, has a switching speed of approximately one nanosecond, has a lifetime of infinite switching cycles, and can access up to 40,000 channels.

Figure 6:
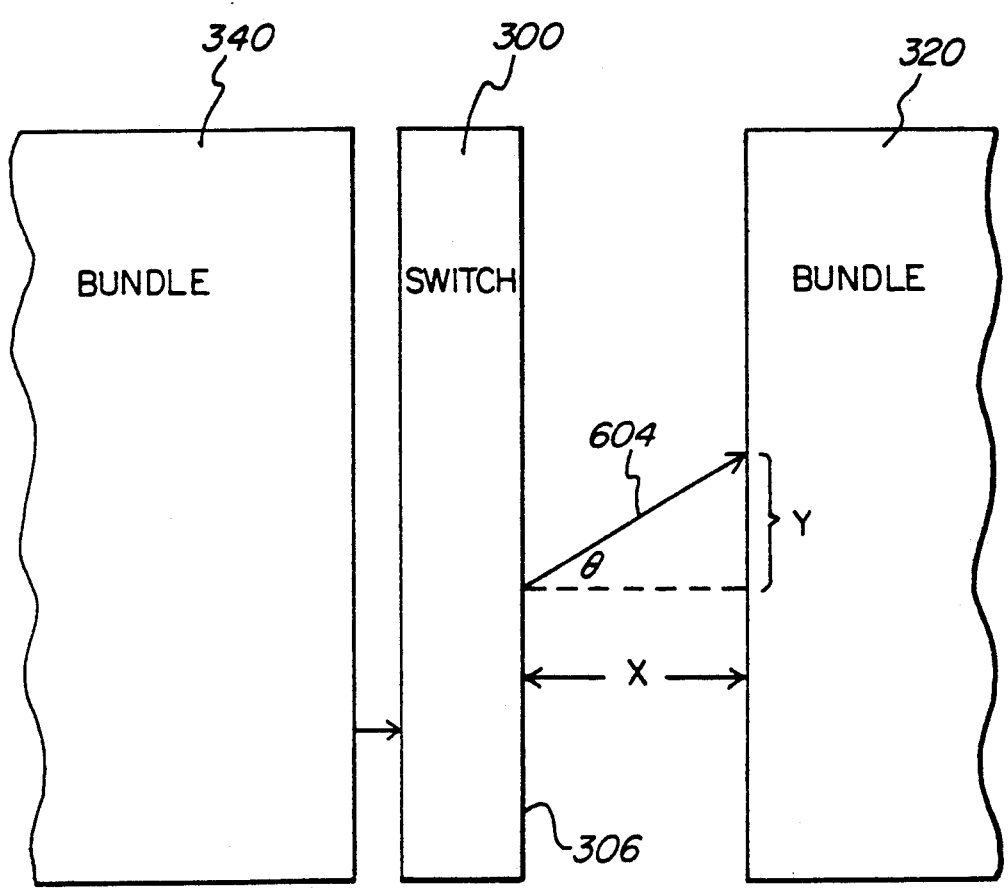
FIG. 6 is a diagram illustrating the manner in which the positioning of the output bundle at a distance from the optical switch can affect the displacement of the switching system.

It is readily seen that light exits switch 300 at an angle (other than "normal") to the output face 306 of substrate 302. This would be the case anyway, due to refraction within the substrate 302, but the situation is exacerbated by the selective steering of light at various angles. This is illustrated in FIG. 6, where a light beam indicated by arrow 604 exits the output face 306 of switch 300 at an angle Θ. Output bundle 320 is located at a distance x from the output face of switch 300. Light beam 604 travels at angle Θ from the output face of switch 300, to output bundle 320. As a result, light beam 604 enters output bundle 320 at a point that is displaced by a distance y from the point where it exits the output face of switch 300. The amount of displacement y is dependent upon the angle Θ and the distance x in the following manner: y=x tan Θ. Consequently, by increasing the distance x between the output face of switch 300 and output bundle 320, the displacement achieved through the use of switch 300 is increased.

Figure 7:
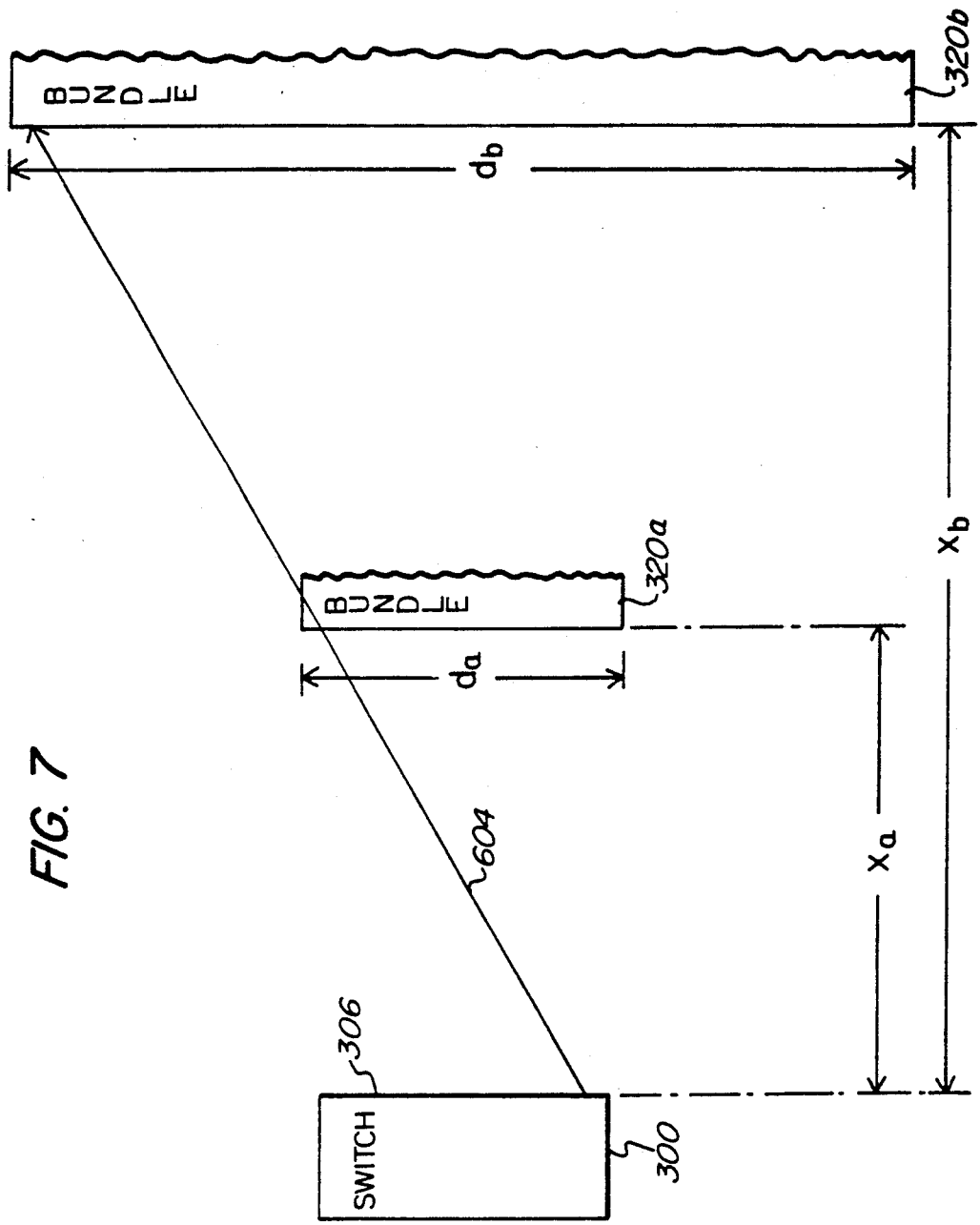
FIG. 7 is a diagram illustrating the manner in which the positioning of the output bundle at a distance from the optical switch can increase the number of output channels that can be utilized with the switch.

As illustrated in FIG. 7, by increasing the distance x between the output face of switch 300 and output bundle 320, the maximum displacement of the switching system can be increased, thereby increasing the number of output channels that can be utilized. The number of output channels utilized with switch 300 is dependent upon the maximum displacement achievable by the switching system. As shown in FIG. 7, when output bundle 320a is positioned at a distance $x_a$ from switch 300, only fibers located within a bundle having a diameter equal to $d_a$ are accessible to switch 300. However, when bundle 320b is positioned at a distance $x_b$ that is located further away from switch 300, fibers located within a larger bundle having a diameter equal to $d_b$ are accessible to switch 300. Therefore, if the fibers utilized in bundle 320b are of the same size as the bundles utilized in bundle 320a, bundle 320b will be able to incorporate a greater number of fibers due to its larger diameter. Consequently, by increasing the distance between switch 300 and output bundle 320, the number of output channels accessible to switch 300 is increased.

The extent to which light rays can be transmitted through the fibers within output bundle 320 is limited by the acceptance angle of those fibers. The acceptance angle of a fiber indicates the maximum angle at which incident light can be transmitted through the fiber. Each fiber has an acceptance angle that is determined by its radius and its index of refraction. By varying these parameters of the fibers within output bundle 320, relatively low acceptance angles can be selected so that interference and crosstalk between the output channels can be minimized.

When it is desired to pass a given input signal through switch 300 and cause it to be displaced by a desired amount D, a benefit can be achieved by double passing the signal through switch 300, i.e. causing the signal to be passed through switch 300 twice. When the input signal is double passed through switch 300, it need only be displaced by D/2 for each pass through the switch in order to achieve a total displacement equal to D. As previously stated, the amount of displacement achieved for light signals passing through switch 300 is proportional to the current in select lines 304 and 308. Therefore, when the input signal is double passed through switch 300, the current needed to achieve the desired displacement D is equal to one-half of the current intensity required when the input signal is single passed through switch 300. As a result, when the input signal is double passed through switch 300, a power saving is achieved by reducing the amount of current through select lines 304 and 308.

An additional benefit achieved by double passing the input light signal through switch 300 is that the maximum achievable displacement for the switching system is increased. As previously stated, the amount of refraction achievable during a single pass through switch 300 is limited to some maximum amount that is hereafter designated as M. If the input signal is double passed through switch 300, it can be displaced by M for each pass, thereby increasing the maximum displacement of the switching system to 2M.

Figure 8:
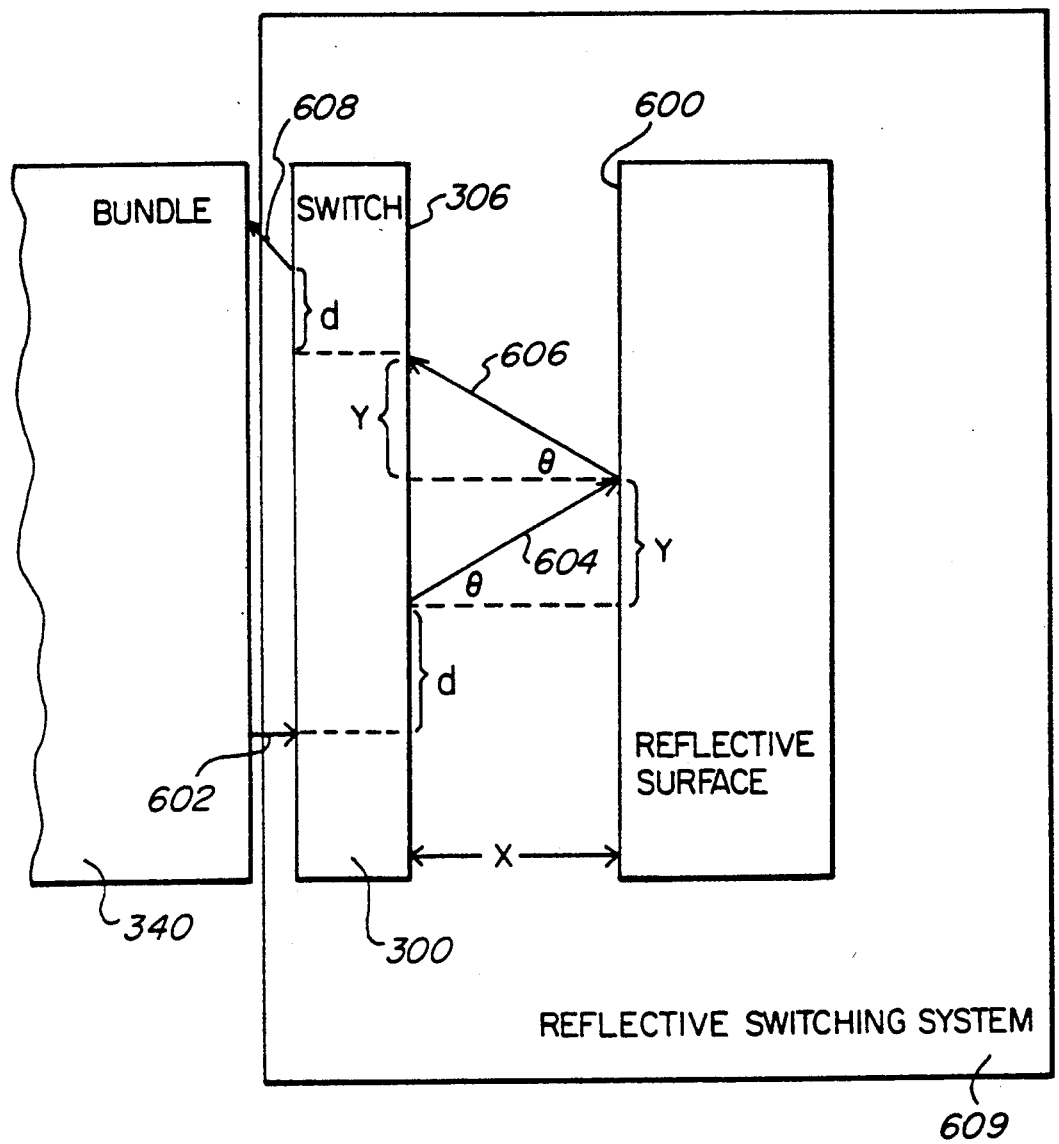
FIG. 8 illustrates a reflective switching system including means for double passing an input signal through the optical switch.

FIG. 8 illustrates a reflective optical switching system 609 that utilizes a means for double passing an input light signal through switch 300. The input signal is sourced from bundle 340 to switch 300 as indicated by arrow 602. The input signal passes through switch 300 and is displaced by an amount d. The displaced signal then exits the output side of switch 300 as indicated by arrow 604 and contacts a reflective surface 600 that is positioned on the output side of the switch. The displaced signal is reflected from reflective surface 600 and is directed back into switch 300 as indicated by arrow 606. Switch 300 then displaces the reflected signal by d resulting in an output signal 608. Output signal 608 is then directed back into bundle 340. In this manner, the input signal is double passed through switch 300.

As illustrated in FIG. 8, the light beam 604 exits switch 300 and travels at an angle $\Theta$ from the output face of switch 300 to reflective surface 600. As a result, light beam 604 contacts reflective surface 600 at a point that is displaced by a distance y from the point where it exits the output face of switch 300. As was stated with respect to the embodiment shown in FIG. 6, the displacement y is defined by the following equation: $y = x \tan \Theta$. When the light beam 604 contacts reflective surface 600, it is reflected back, as indicated by arrow 606, at the same angle $\Theta$ and is therefore displaced again by y. As a result, light beam 606 reenters switch 300 at a point that is displaced by 2y from the point where it exited switch 300.

As illustrated in FIG. 8, the total displacement achieved by the reflective switching system 609 is equal to: $(2x)\tan \Theta + 2d$. Since the total displacement is dependent upon the distance x between the output face of switch 300 and reflective surface 600, the displacement achievable through the use of reflective switching system 609 is increased by increasing this distance x. As previously stated with respect to the embodiment illustrated in FIG. 6, increasing the displacement of the switching system also increases the maximum number of output channels that can be utilized therewith.

As can be seen from FIG. 8, a consequence of double passing the input signal through switch 300 is that output signal 608 exits the switch on the same side at which input signal 602 enters. As a result, means is required for separating input signal 602 from output signal 608. One technique for accomplishing this separation is by dedicating one-half of the fibers within bundle 340 to carry input signal 602, and dedicating the other half of the fibers to carry output signal 608. Although this scheme works properly, every fiber in bundle 340 cannot be used for transporting signals in each direction.

Figure 9:
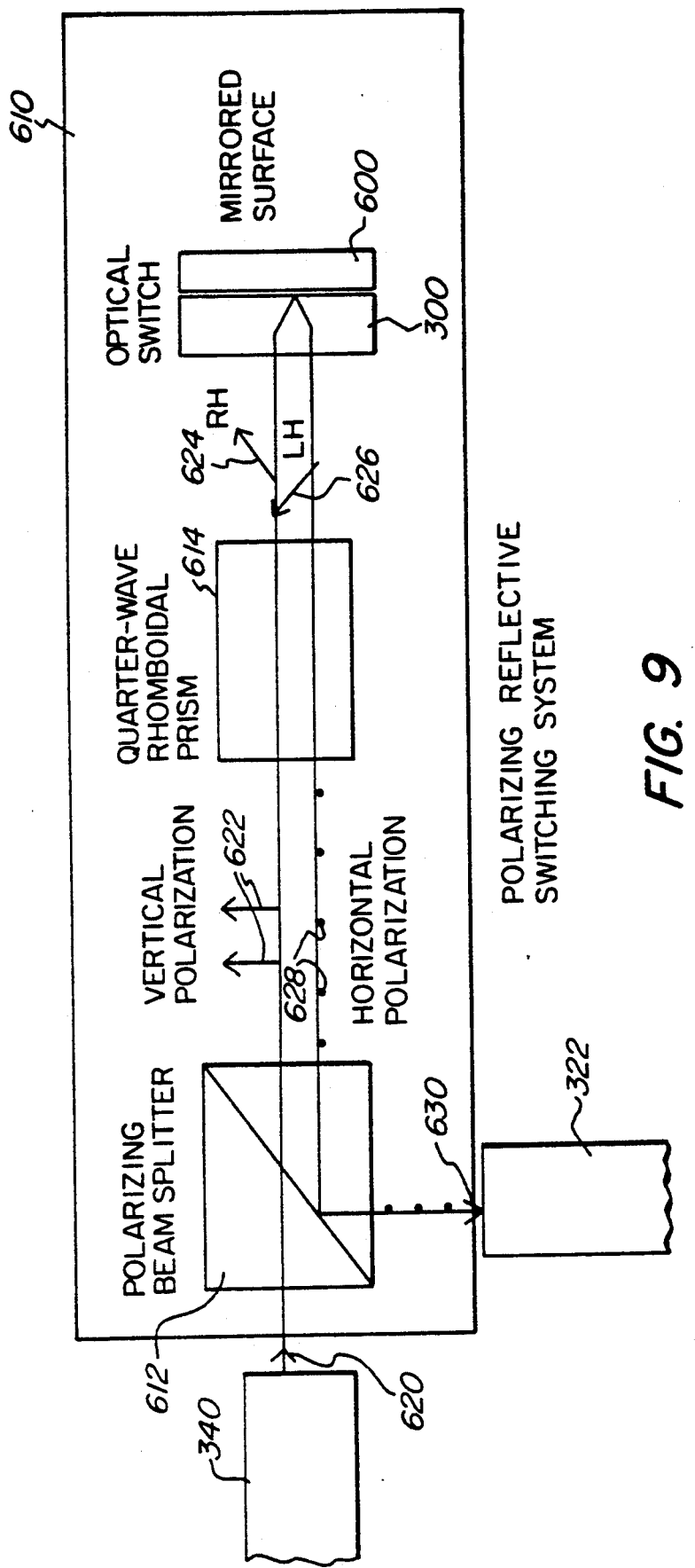
FIG. 9 is a diagram illustrating a polarizing reflective switching system utilizing the optical switch.

FIG. 9 illustrates an alternate embodiment of the present invention in which every fiber in the bundle can be used to transport signals in the same direction. FIG. 9 illustrates a polarizing reflective switching system 610 that provides means for ensuring that the input signal to switch 300 is polarized differently from the output signal from switch 300. Additionally, switching system 610 further includes means for separating the output signal from the input signal based on the polarization difference. More specifically, an input signal indicated by arrow 620 is carried to polarizing reflective switching system 610 by a fiber bundle 340. Input signal 620 passes through a polarizing beam splitter 612 which converts input signal 620 into a vertically polarized signal indicated by arrows 622. Vertically polarized signal 622 passes through a quarter-wave rhomboidal prism 614 which acts as a polarization rotator and creates a right-handed circularly polarized signal indicated by arrow 624. Right-handed circularly polarized signal 624 passes through switch 300 and is thereby displaced before exiting the output side of switch 300. The displaced right-handed circularly polarized signal is reflected from a reflective mirrored surface 600 which affects the signal in two ways. First, the reflection reverses the polarization of the signal to make it left-handed circularly polarized. Second, the left-handed circularly polarized signal is reflected back through switch 300 which further displaces the signal. After exiting switch 300, the displaced left-handed circularly polarized signal (indicated by arrow 626) passes through quarter-wave rhomboidal prism 614, which creates a horizontally polarized signal indicated by dots 628. Horizontally polarized signal 628 passes to polarizing beam splitter 612. Polarizing beam splitter 612 redirects the horizontally polarized signal 628 and outputs it from the polarizing reflective switching system 610 as an output signal indicated by arrow 630. Output signal 630 is directed to output bundle 322. In this manner, the full bundle 340 is utilized to transfer the input signal 620 to the polarizing reflective switching system 610, and the full bundle 322 is utilized to accept the output signal 630.

The implementation of the polarizing reflective switching system 610 shown in FIG. 9 is merely illustrative and a number of different implementations are included within the scope of applicant's invention. Polarizing beam splitter 612, quarter-wave rhomboidal prism 614, and mirrored surface 600 can each be implemented by utilizing any of a number of standard components known to those skilled in the art. Additionally, rather than utilizing a rhomboidal prism as a polarization rotator, a quarter-wave plate can be utilized to perform this function. Similarly, rather than utilizing a discrete beam splitter, the fibers of input bundle 320 can be cut at a Brewster angle and coated with a dielectric coating to accomplish the desired polarizing and splitting functions that the beam splitter 612 performs.

Although the implementation shown in FIG. 9 utilizes the above-described components to polarize the input and output signals in the specific manner described, it should be appreciated that the input and output signals can be polarized in a number of different ways using various other components. In order to separate output signal 630 from input signal 620, the polarizing reflective switching system 610 need only be provided with means for polarizing input signal 620 and output signal 630 in sufficiently different ways to enable the separation thereof. Various other means of accomplishing the desired difference in polarizations to those skilled in the art will be readily apparent, and in view of the present disclosure, will not be exhaustively described herein.

Applications

Figure 10:
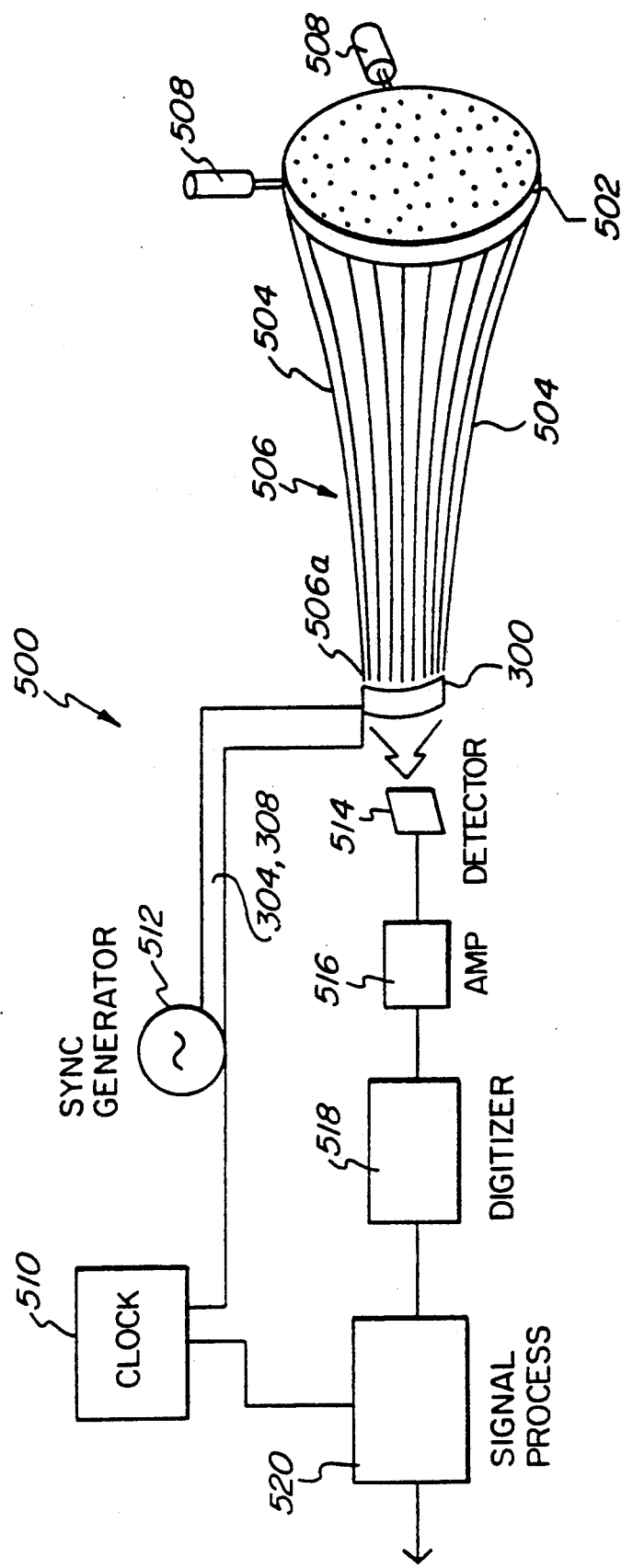
FIG. 10 is a schematic diagram of a robotic eye system employing the optical switch of the present invention.

FIG. 10 shows a robotic eye system 500 employing the optical switch 300 of the present invention. A robotic "eye" 502 contains optics and a plurality of light receptors (such as a silicon array of photodetectors, not shown). Each photoreceptor is associated with an optical fiber 504 in a fiber-optic bundle 506. Motors 508 aim the eye in two axes. Such arrangements are generally known. In the prior art, the far end 506a of the fiber-optic bundle 506 would be provided with an expensive fiber-optic connector.

According to an exemplary application of the present invention, the far end 506a of the fiber-optic bundle 506 is mated with the input face of the optical switch 300. A clock 510 and a sync generator 512 control current provided to the select lines 304, 308 for scanning, in any suitable scanning pattern, the signals arriving from the optical fibers 504, through the switch 300, to a detector 514. The output of the detector 514 is amplified by an amplifier 516 and digitized by a digitizer 518, and is provided to a signal processing circuit 520 that is clocked to the scanning pattern. A stream of data output by the signal processing circuit 520 contains information about the light received by each fiber 504 of the robotic eye 502.

Notably, by using the optical switch of the present invention, the cost and complexity of a robotic eye system is significantly decreased. No costly fiber optic connectors are required, and the system employs as few as one detector (as opposed to "n" detectors for "n" optical fibers, in the prior art).

Another exemplary application for the optical system of the present invention is in connection with a high volume, such as terabyte, optical data storage systems. In the systems of the prior art, diode laser arrays are used to read and write information on an optical tape. A linear scanner tracks across the optical tape, then crosses in the other direction to read or write the next record. The linear scanner must move with great accuracy, and expensive air bearings and coil drives are commonly employed for this purpose.

By using the optical switch of the present invention in a terabyte optical data storage system, moving parts, and the costs, complexities and inefficiencies associated therewith are simply eliminated. By way of example, by driving the optical tape across the output face of the stationary switch 300, entire "blocks" of information (200×200) can be written at once.

Materials and Fabrication

The following materials are suitable for use as the optical medium of the optical switch of the present invention: Lanthanum Borate (LaB) and Lithium Triborate (LBO) Both of these materials have high damage thresholds, on the order of 750 milliwatts per cubic centimeter, operate in the spectral region from 200 nanometers (ultraviolet) to 1.5 micrometers (near infared), and may be formed by isostatic pressing. Lanthanum Borate is also nonlinear, and will exhibit parametric effects which can be exploited in the switch. Another material would be iron-doped lithium niobate. As will be recognized by those skilled in the art, the level of current necessary to operate the optical switch of the present invention will depend upon the type of material forming the optical substrate. For example, liquid-crystal type materials may operate at much lower voltage than lithium niobate.

As mentioned hereinbefore, many materials are suitable for use as superconductive select lines 304, 308, and the list is rapidly evolving to include even more materials that will operate at higher and higher temperatures, approaching room temperature. Materials which may also be attractive are electrically conductive polymers, such as polypherional sulfides.

Figure 12:
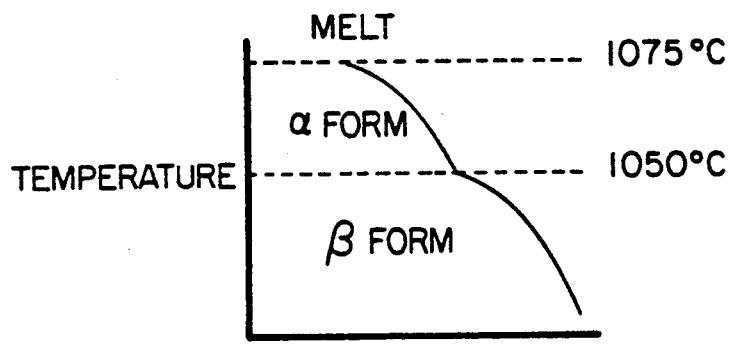
FIG. 12 is a graph of the form of optical switch substrate material as a function of temperature.
Figure 11:
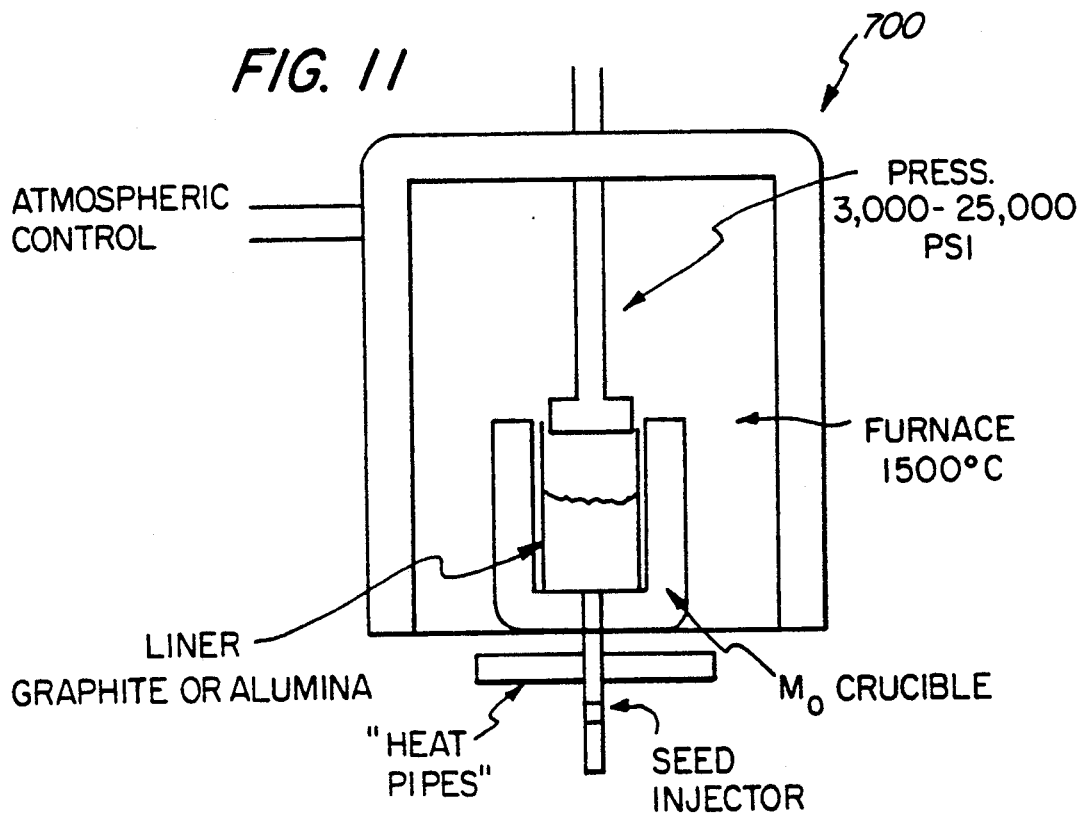
FIG. 11 is a schematic diagram of a system for fabricating the optical switch of the present invention.

FIG. 11 shows a schematic of an apparatus 700 for hot or isostatic pressing the substrate 302. Generally, the optical medium (substrate 302) is grown in a furnace that is capable of attaining a temperature on the order of 1500° C. The molten substrate material ("melt") is contained within a crucible that is lined with graphite or alumina. Seeds of the substrate material are introduced to the melt, and the temperature of the furnace is gradually reduced, first to a range (e.g. between 1075° C. and 1050° C.) where the material is in Alpha form, and then the temperature is lowered further so that the material enters Beta form, as indicated in FIG. 12.

As mentioned hereinbefore, the grid of conductors 304, 308 can be located within the melt in a manner that the substrate grows around and encompasses the conductors.

Another method is to place a powder of crystalline material into the isostatic press and create a solid crystal. In the crystalline powder is powder of superconducting material. During this "pressing" the superconducting powder becomes a ceramic superconductor in the crystalline material. A current material suitable to this technique would be PLZT as the optical media and the 123 superconductor.

Yet an extension of this technique would be to take wafers of optical materials such as lithium niobate and use photolithographic techniques as used in the IC industry to lay down a mask of 123 superconductor or a conducting polymer. Once laid out, the wafer and mask would be placed in a sandwich of wafer, mask, wafer, mask and wafer. This sandwich would be pressed to form a single mass.

I claim:

1. An optical switch, comprising:
   a substrate having an input face and an output face opposite the input face;
   a first set of conductors parallel to one another and disposed in a first plane generally parallel to one face of the substrate;
   a second set of conductors parallel to one another and disposed in a second plane substantially parallel to the first plane, each of said first set of conductors and each of said second set of conductors being substantially perpendicular to each other; and
   a plurality of refractive cells, wherein each refractive cell is defined by a volumetric space between an adjacent pair of said first set of conductors and an adjacent pair of said second set of conductors, further wherein each refractive cell is configured for refracting an input light beam at a select angle.

2. An optical switch according to claim 1, further comprising:
   a plurality of input channels defined on the input face of the substrate.

3. An optical switch according to claim 2, wherein the number of input channels is fewer than the number of cells.

4. An optical switch according to claim 1, further comprising:
   a plurality of output light paths defined on the output face of the substrate.

5. An optical switch according to claim 4, wherein the number of output paths corresponds to the number of cells.

6. An optical switch according to claim 1, further comprising:
   a bundle of optical fibers positioned on the output surface of the substrate.

7. An optical switch according to claim 2, further comprising:
   means for providing coherent light to the input channels.

8. An optical switch according to claim 1, further comprising:
   means for creating electromagnetic flux densities in the conductors defining a cell sufficient to alter the refractive index of a cell.

9. An optical switch according to claim 8, wherein the conductors are formed of a superconductive material.

10. An optical switch according to claim 1, wherein the substrate is formed of at least one of lanthanum Borate, iron doped Lithium Niobate or suitable photorefractive material.

11. An optical switch according to claim 1, wherein the substrate is formed of Lithium Triborate.

12. An optical switch according to claim 1, wherein:
    the faces of the substrate measure about one half inch on a side;
    the number of conductors in the first set is approximately 200;
    the number of conductors in the second set is approximately 200; and
    approximately 40,000 cells are formed by pairs of the two sets of conductors.

13. An optical switching system for selectively directing light signals from a plurality of input paths to a plurality of output paths, said optical switching system comprising:
    an optical switch having first and second sides and means for selectively directing light signals passing between said first and second sides;
    means for optically coupling said plurality of input and output paths to said first side of said optical switch; and
    reflecting means positioned adjacent said second side of said optical switch for reflecting signals passing out of said optical switch back through said optical switch to said output paths.

14. An optical switching system as claimed in claim 13 wherein said input and output paths respectively comprise input and output optical fibers, said input and output optical fibers being located within a single optical cable.

15. An optical switching system as claimed in claim 13 wherein said input and output paths respectively comprise input and output optical fibers, said input and output optical fibers being located within different optical cables.

16. An optical switching system as claimed in claim 15 further including:
    first polarizing means for polarizing light signals from said input paths into a first polarization;
    second polarizing means for polarizing light signals to be directed to said output paths into a second polarization;
    separation means for separating light having said second polarization from light having said first polarization and for directing light having said second polarization to said output optical fibers.

17. An optical switching system as claimed in claim 16 wherein said optical switch includes:
    an optical medium having a refractive index;
    means for locally altering the refractive index of the optical medium in selected volumetric areas; and
    means for passing light through the selected volumetric areas.

18. An optical switching system as claimed in claim 16 wherein said optical switch includes:
    a substrate having a first face corresponding to said first side and a second face opposite the first face, said second face corresponding to said second side;
    a first set of conductors parallel to one another and disposed in a first plane generally parallel to one face of the substrate;
    a second set of conductors parallel to one another and disposed in a second plane substantially parallel to the first plane; and
    a plurality of refractive cells defined in the volumetric space between adjacent pairs of conductors in the first and second sets of conductors.

19. An optical switching system as claimed in claim 15 further including:
    first linear polarizing means for polarizing a light signal from one of said input paths in a linear manner to generate a first linearly polarized signal;
    first circular polarizing means for polarizing said linearly polarized signal in a circularly polarized manner to generate a first circularly polarized signal;
    reverse polarization means for reversing the polarization of said first circularly polarized signal to generate a second circularly polarized signal;

second linear polarizing means for polarizing said second circularly polarized signal in a linear manner to generate a second linearly polarized signal;

beam splitting means for directing said second linearly polarized signal to said output optical fibers.

20. An optical switching system as claimed in claim 19 wherein said first circular polarizing means and said second linear polarizing means comprise a quarter wave rhomboidal prism and wherein said reverse polarization means comprises said reflecting means.

21. An optical switching system as claimed in claim 19 wherein said optical switch includes:

an optical medium having a refractive index;

means for locally altering the refractive index of the optical medium in selected volumetric areas; and means for passing light through the selected volumetric areas.

22. An optical switching system as claimed in claim 19 wherein said optical switch includes:

a substrate having a first face corresponding to said first side and a second face opposite the first face, said second face corresponding to said second side;

a first set of conductors parallel to one another and disposed in a first plane generally parallel to one face of the substrate;

a second set of conductors parallel to one another and disposed in a second plane substantially parallel to the first plane; and a plurality of refractive cells defined in the volumetric space between adjacent pairs of conductors in the first and second sets of conductors.

23. An optical switching system as claimed in claim 13 wherein said optical switch includes:

an optical medium having a refractive index;

means for locally altering the refractive index of the optical medium in selected volumetric areas; and means for passing light through the selected volumetric areas.

24. An optical switching system as claimed in claim 13 wherein said optical switch includes:

a substrate having a first face corresponding to said first side and a second face opposite the first face, said second face corresponding to said second side;

a first set of conductors parallel to one another and disposed in a first plane generally parallel to one face of the substrate;

a second set of conductors parallel to one another and disposed in a second plane substantially parallel to the first plane; and a plurality of refractive cells defined in the volumetric space between adjacent pairs of conductors in the first and second sets of conductors.

* * * * *